United States Patent [19]
Griffin et al.

[11] Patent Number: 5,177,180
[45] Date of Patent: Jan. 5, 1993

[54] HIGH TEMPERATURE MIXED POLYIMIDES AND COMPOSITES FORMED THEREFROM

[75] Inventors: Richard N. Griffin; Robert A. Gray, both of Cincinnati, Ohio

[73] Assignee: General Electric Company, Cincinnati, Ohio

[21] Appl. No.: 563,633

[22] Filed: Aug. 7, 1990

[51] Int. Cl.⁵ .............................. C08G 69/26
[52] U.S. Cl. .................... 528/353; 528/128; 528/125; 528/126; 528/173; 528/174; 528/179; 528/183; 528/184; 528/188; 528/220; 528/229; 528/350; 528/35; 428/473.5
[58] Field of Search ............... 528/125, 126, 128, 173, 528/179, 183, 184, 188, 229, 351, 353, 350, 174; 428/473.5

[56] References Cited

U.S. PATENT DOCUMENTS

| | | | |
|---|---|---|---|
| 3,179,633 | 4/1965 | Endrey | 528/353 |
| 3,234,181 | 2/1966 | Olivier | 528/353 |
| 3,356,648 | 12/1967 | Rogers | 528/208 |
| 3,407,176 | 10/1968 | Loncrini | 528/353 |
| 3,422,061 | 1/1969 | Gall | 528/208 |
| 3,424,718 | 1/1969 | Angelo | 528/353 |
| 3,959,350 | 5/1976 | Rogers | 528/353 |
| 4,048,142 | 9/1977 | Takeoshi | 528/208 |
| 4,238,538 | 12/1980 | Manwiller | 428/36 |
| 4,336,175 | 6/1982 | Gibbs | 528/353 |
| 4,477,648 | 10/1984 | Jones et al. | 528/185 |
| 4,524,171 | 6/1985 | Bakshi et al. | 528/353 |
| 4,568,715 | 2/1986 | Itatani et al. | 528/172 |
| 4,569,988 | 2/1986 | Scola et al. | 528/353 |
| 4,576,857 | 3/1986 | Gannett et al. | 528/353 |
| 4,612,361 | 9/1986 | Peters | 528/185 |
| 4,612,361 | 9/1986 | Peters | 528/185 |
| 4,631,335 | 12/1986 | Scola et al. | 528/353 |
| 4,680,373 | 7/1987 | Gallagher et al. | 528/185 |
| 4,725,642 | 2/1988 | Gannett et al. | 528/353 |
| 4,794,157 | 12/1988 | Berdahl et al. | 528/208 |
| 4,855,391 | 8/1989 | Berdahl et al. | 528/188 |
| 4,864,015 | 9/1989 | Cella et al. | 528/352 |
| 4,874,835 | 10/1989 | Berdahl | 528/179 |
| 4,876,329 | 10/1989 | Chiang et al. | 528/353 |
| 4,877,653 | 10/1989 | Vora et al. | 528/353 |

FOREIGN PATENT DOCUMENTS 323912 12/1989 European Pat. Off. .
2491076 2/1982 France .

Primary Examiner—John Kight, III
Assistant Examiner—P. Hampton-Hightower
Attorney, Agent, or Firm—Jerome C. Squillaro; Carmen Santa Maria

[57] ABSTRACT

Polyimide intercondensation products are prepared from mixed dianhydrides and aromatic diamines. One of the mixed dianhydrides must be 2,2-bis(3,4-dicarboxyphenyl)-hexafluoropropane dianhydride (6FDA) and the other dianhydride may be oxydiphthalic anhydride (ODPA) or biphenyl dianhydride (BPDA) or mixtures thereof. Preferred aromatic diamines are p-phenylenediamine (PPD) and/or m-phenylenediamine (MPD). The polyimide products have increased glass transition temperatures (Tg), frequently higher than 400° C. Composites made from the polyimides have high thermal and oxidative stability and may be used in aircraft engine hardware.

39 Claims, No Drawings

HIGH TEMPERATURE MIXED POLYIMIDES AND COMPOSITES FORMED THEREFROM

BACKGROUND OF THE INVENTION

This invention relates to polyimides, and more particularly, to polyimides which are the intercondensation product of mixed dianhydrides and aromatic diamines, to composites formed therefrom, and to a method of improving the glass transition temperature of polyimides formed from the intercondensation product of mixed dianhydrides.

Polyimides are well-known in the art and have been widely used in applications requiring high thermal stability and oxidative stability. Polyimides are generally obtained by reacting specific tetracarboxylic acids or dianhydrides with primary diamines to obtain polyamic acids which can subsequently be converted to the corresponding polyimide.

In U.S. Pat. No. 4,336,175 which is incorporated by reference herein in its entirety, stoichiometric monomer imbalances of 2,2-bis(3,4-dicarboxyphenyl)hexafluoropropane (6FTA) and an aromatic diamine in solvent mixtures are used to provide a binder solution having an increased temperature range over which a laminate of this binder and reinforcing filler can be compacted.

In the prior art, meta- and para-phenylenediamine have been condensed with various tetracarboxylic acid dianhydrides, such as pyromellitic dianhydride (PMDA) or bis(3,4-dicarboxyphenyl)ether dianhydride, to form coalescable polyimide powders of high thermal stability as in U.S. Pat. No. 3,422,061 which is incorporated herein by reference in its entirety. Bis(3,4-dicarboxyphenyl)ether dianhydride is also known as 4,4'-oxydiphthalic anhydride (ODPA). In U.S. Pat. No. 3,422,061, the polyimides are prepared in the form of powders which are fabricable in the range of 300° to 550° C. Combinations of various aromatic tetracarboxylic dianhydrides, such as bis(phenyldicarboxylic anhydrides) and aromatic amines, such as bis(phenylamines) are also discussed in U.S. Pat. Nos. 3,234,181 and 3,424,718, both of which are incorporated herein by reference in their entirety. In an attempt to improve the glass transition temperature (to between about 220° C. to about 385° C.), polyimides were prepared by reacting 2,2-bis(3,4-dicarboxyphenyl)hexafluoropropane dianhydride (6FDA) with at least one aromatic primary diamine in U.S. Pat. No. 3,959,350 which is incorporated by reference herein in its entirety.

The use of two dianhydrides with aromatic diamines has also been shown in the art in U. S. Pat. Nos. 3,407,176, 4,612,361, 4,680,373, 4,794,157 and 4,864,015, all of which are incorporated herein by reference in their entirety. In U.S. Pat. No. 4,864,015, the glass transition temperature (Tg) of aromatic polyimides was improved by intercondensing aromatic dianhydrides with one or more aromatic diamines, and by using thianthrene dianhydride and one or more aromatic diamines, the resulting polyimides had Tg's in excess of 400° C. In U.S. Pat. No. 4,612,361, two dianhydrides, one of which is a fluoro-containing dianhydride, such as 2,2-bis(3,4-dicarboxyphenyl)hexafluoropropane dianhydride (6FDA), and p-phenylenediamine are used to prepare polyetherimides. The polyetherimides of U.S. Pat. No. 4,612,361 exhibit both increased Tg and increased solubility in halogenated solvent, and although it is shown therein that the 6FDA raises the Tg of the polyetherimide, the Tg of the corresponding polyetherimide was raised from 217° C. (without 6FDA) to only 235° C. (with 6FDA) in a polyetherimide made from the mixed dianhydrides wherein the other dianhydride was bisphenol-A dianhydride (BPADA).

Polyimides based on 6FDA are commercially available, and polyimides based on ODPA have been discussed above. Polyetherimides are described in U.S. Pat. No. 4,794,157 where ODPA is used as the other dianhydride with BPADA or PMDA and aryl diamine. The polyimides made from 6FDA or ODPA and meta- or para-phenylenediamines have adequate thermal and oxidative stability to survive 100-500 hours exposure in air at 371° C. with minimal degradation. The Tg of polyimides derived from 6FDA and phenylenediamine range from about 350° C. to 371° C., and the Tg of polyimides derived from ODPA and phenylenediamine is about 300° C. However, the Tg of these prior art polyimides does not permit their use in structural applications at 371° C. It is generally desirable to have the Tg of polyimides at least about 28° C. higher than the use temperature, that is, the temperature at which the polyimide is actually used or subjected to, when it is incorporated in an article or operating device.

Although many of the polyimides discussed above and prepared by the processes of the prior art have an adequate Tg and oxidative stability, it is always desirable to improve such properties so that laminates, adhesives, composites and other articles made therefrom withstand prolonged exposure to high pressure air or atmospheric conditions at elevated temperatures. The prior art polyimides discussed above do not have adequate thermal and oxidative stability to permit their use in structural applications requiring prolonged exposure to high pressure air or atmospheric conditions at elevated temperatures, such as at about 370° C.

SUMMARY OF THE INVENTION

It is the primary object of the present invention to provide polyimides having improved glass transition temperatures.

Another object of the present invention is to provide a method of increasing the glass transition temperature of polyimide resins.

Another object of the present invention is to provide laminates, adhesives, composites or articles from polyimides having improved thermal and oxidative stability to permit their use in structural applications.

Still another object of the present invention is to provide polyimides prepared from mixed dianhydrides and derivatives thereof and aromatic diamines wherein the polyimides have improved glass transition temperatures.

It has now been surprisingly discovered that polyimides having substantially improved glass transition temperature can be prepared from mixed dianhydrides and aromatic diamines when one of the mixed dianhydrides is a biphenyl dianhydride (BPDA) including the tetracarboxylic acid or the ester derivatives or mixtures thereof, or an oxydiphthalic anhydride (ODPA) including the tetracarboxylic acid or the ester derivatives or mixtures thereof, and the other dianhydride is a fluoro-containing dianhydride (6FDA) including the tetracarboxylic acid or the ester derivatives or mixtures thereof. In accordance with the present invention, there is provided a polyimide having improved glass transition temperature (Tg) comprising the intercondensation product of reaction of (a) mixed dianhydrides wherein one of the mixed dianhydrides is a biphenyl dianhydride (BPDA) including the tetracarboxylic acid or ester derivatives or mixtures thereof, or an oxydiphthalic anhydride (ODPA) including the tetracarboxylic acid or ester derivatives or mixtures thereof, and the other dianhydride is 2,2-bis(3,4-dicarboxyphenyl)-hexafluoropropane dianhydride (6FDA) including the tetracarboxylic acid or ester derivatives or mixtures thereof, and (b) aromatic diamines.

As used herein, the derivatives of the dianhydrides include the tetracarboxylic acid derivatives, the tetraester derivatives, the monoacid/triester derivatives, the triacid/monoester derivatives and the diacid/diester derivatives and any mixtures thereof, as well as the dianhydride form of the reactants, and reference herein to the "derivatives" of the dianhydrides includes the foregoing as well as ring-substituted derivatives thereof.

In accordance with the present invention, there is also provided a method of increasing the glass transition temperature (Tg) of polyimide resins derived from a reaction mixture of aromatic diamines and mixed dianhydrides wherein one of the mixed dianhydrides is a biphenyl dianhydride or derivatives thereof (BPDA) or an oxydiphthalic anhydride (ODPA) or derivatives thereof, or a mixture thereof comprising adding 2,2-bis(3,4-dicarboxyphenyl)hexafluoropropane dianhydride (6FDA) or derivatives thereof as the other mixed dianhydride to the reaction mixture whereby a polyimide is formed by the intercondensation of aromatic diamines and the mixed dianhydrides.

It has been found in accordance with the present invention that laminates, composites or articles can be readily fabricated with the polyimide resin of the present invention and that the glass transition temperature of such laminates, adhesives, composites or articles is substantially improved and results in laminates, composites or articles having substantially higher use temperature.

As used herein the terms laminates, composites and articles are used interchangeably, and reference to one of the terms refers to the other terms.

DETAILED DESCRIPTION OF THE INVENTION

Because of the intercondensation reaction of the mixed dianhydrides or derivatives thereof and aromatic diamines, the polyimides of the present invention contain the following reactants or their precursors or derivatives prior to the intercondensation reactions. The polyimides of the present invention are derived from the dianhydride of formula (A)

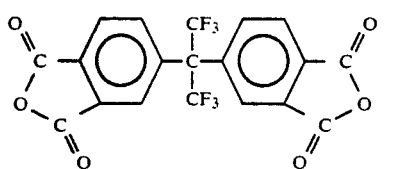

or derivatives thereof, including halogen (Cl, F or Br), alkyl or aryl substituted derivatives; the dianhydrides, or derivatives thereof, of either formulas (B) or (C) or mixtures of (B) and (C);

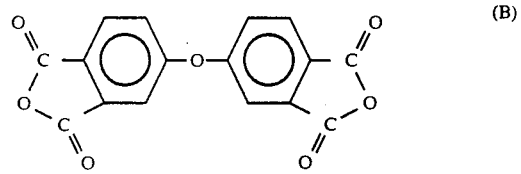

or

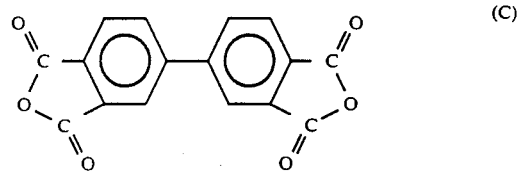

and aromatic diamines of the formula (D):

$$H_2N-R-NH_2 \quad (D)$$

wherein R is a divalent aromatic hydrocarbon radical having from 6 to about 20 carbon atoms and halogenated derivatives thereof.

As indicated above, the tetracarboxylic acid derivatives, the tetraester derivatives, the monoacid/triester derivatives, the triacid/monoester derivatives or the diacid/diester derivatives of (A), (B) and (C) above, and mixtures thereof, as well as the dianhydrides (A), (B) and (C) can be used in the present invention. Ring-substituted derivatives of the dianhydrides or the tetracarboxylic acid or ester derivatives, e.g. Br, F or Cl substituted derivatives, or hydrocarbon derivatives of the dianhydrides or the tetracarboxylic acid or ester derivatives, e.g., alkyl, aryl and the like, may also be used in the present invention. The halogen atoms or hydrocarbon groups are commonly substituted on the benzene ring in the dianhydrides or the dicarboxylic acid or ester derivatives of formulas (A), (B) and (C). In the tetracarboxylic acid derivatives or (A), (B) and (C), the anhydride portions of the molecule are in the carboxylic acid form, as well-known in the art. In the tetraester or the acid/ester derivatives, that is, monoacid/triester, diacid/diester, or triacid/monoester, of formulas (A), (B) and (C), the anhydride portions of the molecule are in the ester form for the tetraester derivatives or in combinations of the carboxylic acid and the ester forms for the acid/ester derivatives. The common ester group which may be used in the present invention, is R'—O-CO— wherein R' is an alkyl group, an ether or the like, as well-known in the art. In the preferred ester groups of the present invention, R' is methyl, ethyl or 2-(2-methoxyethoxy)ethyl groups. In the tetraester derivatives of (A), (B) and (C), the carboxyl portions of the molecule are all in the ester form; in the triacid/monoester derivatives, there are three carboxylic acid groups and one ester group; in the diacid/diester derivatives, there are two carboxylic acid groups and two ester groups and in the monoacid/triester derivatives, there is one carboxylic acid group and three ester groups in the carboxyl positions of the respective formulas (A), (B) and (C). One skilled in the art can easily substitute conventional carboxylic acid and ester groups for one or both anhydride portions of formulas (A), (B) and (C) in order to obtain derivatives within the scope of the present invention. It is also possible for one skilled in the art to provide various combinations of the foregoing to achieve the objects of the present invention.

The polyimide products having improved glass transition temperature in accordance with the present invention after reacting with the aromatic diamines have structural units of the formula:

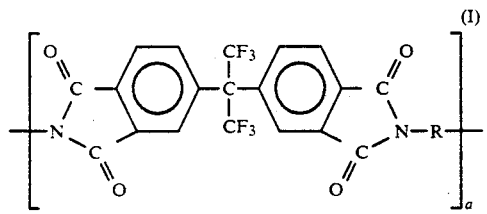

and

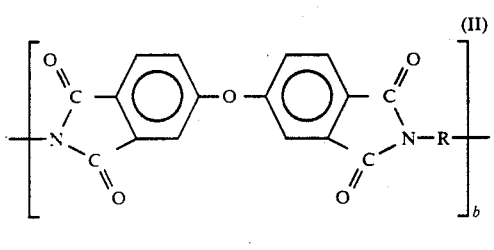

or

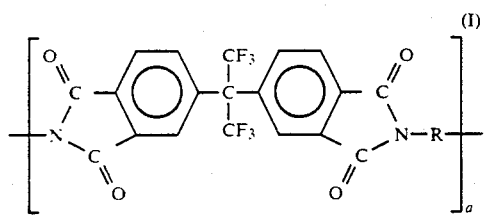

and

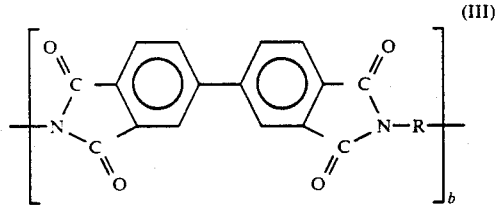

or mixtures of Formulas (I), (II) and (III), wherein R is a divalent aromatic hydrocarbon radical having from 6 to about 20 carbon atoms and halogenated derivatives thereof, and a and b each represent a whole number equal to or greater than 1.

In the combinations of reactants (A), (B) and (D) or (A), (C) and (D) or (A), (B), (C) and (D) of the present invention, (A) is generally used in equimolar quantities with or in less than equimolar quantities than (B) or (C) or (B) and (C). In preferred embodiments, the molar ratios of (A):(B) or (A):(C) or (A):(B)+(C) is from about 1:1 to about 1:9. It is generally preferred that there be an equimolar amount of (D) and an equimolar amount of (A) and (B) or (A) and (C) or (A), (B) and (C). In certain instances, however, an excess of either anhydride or derivatives thereof or diamine component by as much as 10% may be advantageous as may be easily determined by one skilled in the art.

In the present invention, the predominant portion of the polymer chain comprises structural units of the formula:

$[I]_m [II]_{1-m}$ or $[I]_m [III]_{1-m}$ or $[I]_m [II+III]_{1-m}$ or $[I]_m [II]_n + [III]_{1-m-n}$ where the mole fraction m stands for a number greater than 0 and less than 1, preferably at least between about 0.10, and about 0.50 and most preferably, 0.25; and n is the mole fraction of an optional additional constituent, which when present, is a number greater than 0 and less than or equal to $1-m$.

The aromatic diamines used in the intercondensation reaction of the present invention can be any of the aryl diamines or aromatic diamines well-known in the art. Among the aromatic diamines or mixtures thereof which may be used in the polyimides of the present invention, there are included, for example, meta-phenylenediamine; para-phenylenediamine; 4,4'-diaminodiphenylpropane; 4,4'-diaminodiphenylmethane; benzidine; 4,4'-diaminodiphenyl sulfide; 4,4'-diaminodiphenyl sulfone; 4,4'-diaminodiphenyl ether; 1,5-diaminonaphthalene; 3,3'-dimethylbenzidine; 3,3'-dimethoxybenzidine; 2,4-bis($\beta$-amino-t-butyl)toluene; bis(p-$\beta$-methyl-o-aminopentyl)- benzene; 1,3-diamino-4-isopropylbenzene; m-xylylenediamine; p-xylylenediamine; 2,4-diaminotoluene; 2,6-diaminotoluene; and the like. Meta-phenylenediamine, para-phenylenediamine and mixtures thereof are the preferred aromatic diamines used in the present invention, and the most preferred aromatic diamine of the present invention is para-phenylenediamine. Naturally, as indicated above, mixtures of aromatic diamines may be used to prepare the polyimides or polyimide precursors having the improved glass transition temperatures of the present invention.

The mixed dianhydrides of the present invention must be either a biphenyl dianhydride (BPDA) or derivatives thereof or an oxydiphthalic anhydride (ODPA) or derivatives thereof (or mixtures of any or the foregoing and 2,2-bis(3,4-dicarboxy-phenyl)hexafluoropropane dianhydride (6FDA) or derivatives thereof. The BPDA or a derivative thereof, such as the tetracarboxylic acid, diacid/diester or the halogen derivatives (e.g. Cl or F substituted BPDA) can be used as one of the mixed dianhydrides of the present invention. Alternatively, or mixed with the BPDA, the dianhydride can also be ODPA or derivatives thereof. In accordance with the present invention, either BPDA and/or ODPA or derivatives thereof must be used in conjunction with 6FDA or derivatives thereof. The ODPA can also be in various isomeric forms including 4,4'-oxydiphthalic anhydride; 3,4'-oxydiphthalic anhydride; 3,3'-oxydiphthalic anhydride and mixtures thereof.

In accordance with the present invention, the preferred oxydiphthalic anhydride is 4,4'-oxydiphthalic anhydride (ODPA).

Generally, the aromatic diamines which are useful in the intercondensation reaction for the preparation of the polyimides or polyimide precursors having increased glass transition temperature, have the formula,

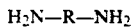

where R is divalent aromatic hydrocarbon radical having from 6 to about 20 carbon atoms and halogenated derivatives thereof. The R provides the aromatic hydrocarbon radical in the intercondensation precursor or reaction product, for example, a para-phenylene radical or a meta-phenylene radical when the aromatic diamine is para-phenylenediamine or meta-phenylenediamine respectively.

The process of making the polyimide resins of the present invention is not critical as long as the dianhydrides, or derivatives thereof, are mixed before contacting the aromatic diamine to form the polyimide resin precursor or the polyimide resin by the intercondensation of the aromatic diamine and the mixed dianhydrides, one of the mixed dianhydrides being 6FDA or derivatives thereof. In preferred embodiments, the mixed dianhydrides are charged into a reactor in the presence of a suitable solvent. Thus, 6FDA and ODPA or 6FDA and BPDA or 6FDA and both ODPA and BPDA (or derivatives of any of the foregoing) are added to the reactor in the presence of a suitable solvent.

Conventional solvents well-known in the art can be used for the reaction mixture, for example, diglyme, N-methylpyrrolidone, diglyme and methyl alcohol, N-methylpyrrolidone and methanol, and the like, as discussed in more detail below relative to the preparation of composites. The mixed dianhydrides or derivatives thereof are dissolved in the solvent, for example, by reflux. The aromatic diamines are added to the mixed dianhydrides or derivatives thereof dissolved in solvent, the aromatic diamines also preferably being dissolved in the same solvent when they are added to the mixed dianhydrides. The reaction mixture, that is, the polyimide precursor, can be used immediately and converted to the polyimide resin, or it can be stored, for example in a freezer, for future use.

As is well-known in the art, polyimides can be prepared by starting with the corresponding acids or esters rather than the anhydrides and passing through the polyamic acid stage followed by imidization to the polyimide. This method of preparation is preferred in the present invention. The polyamic acid is formed from the corresponding tetracarboxylic acids or esters and aromatic diamine, the tetracarboxylic acids or esters corresponding to the equivalent dianhydrides discussed above, for example, the tetracarboxylic acid of 6FDA known as 6FTA, the tetracarboxylic acid of ODPA known as ODPTA, and the tetracarboxylic acid of BPDA known as BPTA.

In the preferred embodiments of the present invention, the diesters are reacted with the aromatic diamine to form a corresponding polyamic acid or polyamic ester, defined herein as the polyimide precursor, which converts to the polyimide resin with the formation of water and alcohol. Examples include the alkyl diesters of 6FTA known as 6FDE; the alkyl diesters of ODPTA known as ODPDE; and the alkyl diesters of BPTA known as BPDE. The preferred alkyl groups are methyl, ethyl, alkoxy and the like. The water and alcohol can be removed by any conventional method, for example, chemically or with heat and pressure. The application of heat to the polyimide precursor accelerates the conversion of the polyimide precursor to the polyimide resin. Heat ranging from above ambient to below the decomposition temperature of the resin, and preferably from ambient to about 400° C. and more, preferably from about 300° C. to about 370° C. for up to about 24 hours may be used to convert the polyimide precursor, that is, the reaction mixture of mixed dianhydrides or derivatives thereof and aromatic diamine in solvent, to the polyimide resin.

The polyimide precursor, as used herein, is the reaction product formed as an intermediate before the loss of water occurs when the aromatic diamine reacts with the dianhydride or derivatives thereof, and in certain instances, it may be a polyamic ester, or it may be a polyamic acid. The form of the polyimide precursor is not critical in the intercondensation reaction products and laminates of the present invention as long as the critical reactants, that is, the 6FDA and ODPA or BPDA or the 6FDA, ODPA and BPDA or their derivatives intercondense with diamine to form the polyimides of the present invention.

Although no catalyst or chain termination agent is required in preparing the polyimides of the present invention, conventional catalysts and chain termination agents can be used in the preparation of the polyimides of the present invention. Other additives and agents can also be added to the polyimide resins of the present invention as long as they do not interfere with the thermal or oxidative stability of the polyimide resin. For example, conventional flame retardants, plasticizers, dyes and pigments as well as various inert fillers can be added to the polyimide precursors or polyimides of the present invention.

The polyimides of the present invention are useful as binders in composites, adhesives, laminates, articles and the like. Polyimides have been used as binders for laminar structures of the prior art, for example in U.S. Pat Nos. 4,336,175 and 4,477,648 which are incorporated by reference herein in their entirety. The polyimides of the present invention are used in conjunction with reinforcing agents to form improved laminates, composites, articles and the like. Improved graphite fiber-reinforced laminates have been readily fabricated with the polyimide resins of the present invention. Such laminates are especially useful for washers, bushings, exhaust flaps and ducts in aircraft engines.

The laminates, composites and articles of the present invention may be made by any conventional technique, such as those illustrated in U.S. Pat. Nos. 4,336,175, 4,477,648 and 4,794,157 discussed above. Adhesives of the present invention may be made by any conventional technique practiced by those familiar with the preparation of adhesives.

Generally, the laminates, adhesives, composites, articles and the like of the present invention are made from a solution of the polyimide precursor, either a freshly-prepared solution of polyimide precursor or a stored solution of the polyimide precursor. The stored solution of the polyimide precursor can remain liquid during the periods of storage, or it can be frozen and subsequently thawed for use.

In one preferred method of making the composites of the present invention, a polyimide precursor solution, that is, a solution of the aromatic diamine and mixed dianhydride (or derivatives) reactants in a non-reactive (inert) solvent, generally referred to in the art as a polyamic acid or polyamic ester solution or precursor, is admixed with the reinforcing agent and then converted to the polyimide. In this method, the polyimide precursor solution, for example, 6FDE, ODPDE, aromatic diamines and solvent; 6FDE, BPDE, aromatic diamines and solvent; or 6FDE, ODPDE, BPDE, aromatic diamines and solvent, are admixed with the reinforcing fiber or fabric or a particulate filler, and the polyimide precursor solution is then converted to the final polyimide. Simultaneously with, prior to and/or subsequent to the conversion to the final polyimide form, pressure can be applied to the laminate to compact it and reduce the voids left by the removal of solvent and/or water generated by the precursor conversion to polyimide resin. Naturally, it is within the purview of one skilled in the art to provide articles of the polyimides of the present invention by forming and/or compacting the polyimide precursor solutions of the present invention into a desired shape or configuration and thereafter converting the precursor solution to the polyimide by curing, for example by application of heat and the removal of water.

Any suitable solvent in which the organic diamines and dianhydrides are soluble, can be used for the preparation of the binder solutions as discussed above for the method of preparing the polyimides and polyimide precursors of the present invention. Preferred solvents for preparing the binder solutions used in the laminates, composites and articles include a dipolar aprotic solvent, for example N,N-dimethylacetamide, N-methyl-2-pyrrolidone and N,N-dimethylformamide, and such solvents as lower alkanols of about 1 to 4 carbon atoms, for example, methanol, ethanol and the like, diethylene glycol dimethyl ether (diglyme) and mixtures of lower alkanols and diglyme with each other or with up to 50% N-methyl-2-pyrrolidone. Of the lower alkanols, methanol is preferred.

The polyimide binder solution can be prepared by admixture of the components according to normal techniques, adjusting the proportions of the monomeric (aromatic diamine and mixed dianhydrides) components to provide a stoichiometric monomer balance or imbalance of aromatic diamine and mixed dianhydrides, preferably in ratio of 1 mole of aromatic diamine for each mole of mixed dianhydrides wherein the mixed anhydrides, ODPA:6FDA or BPDA:6FDA are present in molar ratios from about 1:9 to about 9:1 and more preferably about 3:1.

The reinforcing agents used in conjunction with the binder solution are not critical and can be selected from a wide variety of fibers and particulate fillers including, for example, graphite fibers, silicon carbide fibers or whiskers, carbon fibers, glass fibers, boron fibers, aramid fibers, or metal fibers, mica, graphite powder and the like. The reinforcing agent can be used in amounts of up to about 70 volume percent, preferably from about 40 to 60 volume percent, based on the total volume of the structure. In the preferred composites of the present invention, the amount of polyimide binder solution is about one (1) to three (3) times the weight of the reinforcing agent, e.g. graphite fiber and most preferably about 1.5 to 2.0 times the weight of the fabric. The amount of reinforcing agent can be any amount sufficient to reinforce the laminate the desired amount for its intended purpose, and accordingly, can be used in a "reinforcing amount". The fibers can be positioned randomly or in any unidirectional or multi-directional configuration as desired in the laminates of the present invention. Generally, the preferred reinforcing agents used in the composites of the present invention are woven fabrics or non-woven mats of the fibrous agent, for example, a woven cloth of graphite fiber.

The reinforcing agents may be impregnated, coated or otherwise formed into laminates with the polyimide precursor solutions of the present invention in any conventional manner, for example, by spraying, dipping, soaking, padding, applying by squeegee, rolling and the like. Pressure may be conventionally applied to consolidate the fibers and the polyimide or polyimide precursor binder solution. Heat is applied to the laminate in the uncured stage to complete the intercondensation reaction, that is, the conversion of the polyimide precursor, that is, the polyamic acid or polyamic ester solution of the aromatic diamines and mixed dianhydride derivatives, to the polyimide. In the instant invention, the application of heat causes the formation and loss of water, and in certain instances alcohol, and the formation of the cured polyimide intercondensation product of reaction. This heating or can be carried out under any heating conditions. However, it is preferred that temperatures from about 200° C. to about 400° C., preferably from about 300° C. to about 370° C. for up to about 24 hours be used to make the laminates of the present invention. To form articles in accordance with the present invention, conventional means can be used, for example, layers of the composites or laminates prepared above can be stacked in a mold; pressure and heat can be applied for a suitable time until the layers are fused or fixed together, and the molded article can then be post-cured, for example, at a temperature up to 370° C. in air and/or up to 400° C. for up to 24 hours, under an inert gas, for example, nitrogen.

The laminates made with the polyimides of the present invention have superior thermal and thermooxidative stability at temperatures of about 370° C. for a minimum service life of about 100 to about 500 hours.

In order that those skilled in the art will be better able to practice the present invention, the following examples are given by way of illustration and not by way of limitation. Unless otherwise specified, all parts are by weight. All glass transition temperatures were measured by conventional techniques.

EXAMPLE 1

The solutions of the present invention were prepared in a resin kettle equipped with a reflux condenser. The mixed dianhydrides were added to solvent or solvent mixture and heated under reflux in the resin kettle until they were dissolved, as evidenced by the clarity of the solution. The solution of mixed diester was cooled to room temperature. An aromatic diamine or mixture of aromatic diamines was dissolved in solvent or solvent mixture and combined with the mixed diester solution which had been cooled to room temperature. The resulting product was the polyimide precursor intermediate which was either stored for subsequent use as a binder and conversion to the polyimide in the preparation of laminates, composites or articles, or which may be immediately used as a binder material for composites, laminates or articles and converted to the polyimide resin by the application of heat.

In Example 1, ODPA and 6FDA were dissolved in methanol under reflux in a molar ratio of 3:1 to form the corresponding esters, ODPDE and 6FDE. Paraphenylenediamine (PPD) was dissolved in methanol and added to the ODPDE/6FDE/methanol solution which had been cooled to room temperature. The solution was stored in a freezer until used to make laminates. Several samples of graphite fiber in the form of a woven fabric were impregnated with the combined solutions and heated at about 300° C. to remove water, methanol and solvent and to cure the polyimide.

After postcure, the graphite fiber reinforced laminates had glass transition temperatures which ranged from 395° C. to 429° C.

Various degradation tests conducted on the samples of graphite fiber reinforced laminate showed that exposure of the laminate sample to flowing air at 370° C. and 4 atmospheres of pressure resulted in less than a 14% loss of weight and less than a 5% change in thickness of the laminate in 100 hours. At 343° C. and 4 atmospheres of flowing air for 100 hours, the weight loss of the graphite fiber reinforced laminate was about 2% with less than 1% change in dimensions.

EXAMPLES 2-4

Three polymers were prepared from various combinations of ODPA and 6FDA and reacted with PPD as shown in TABLE 1 below where percentages are shown in mole percent.

In Example 2, 109.54 grams of ODPA (45 mol percent), and 17.43 grams of 6FDA (5.0 mol percent) were dissolved in 223 ml. of methyl alcohol as described in Example 1 above. To this solution was added 42.42 grams of PPD (50.0 mol percent) dissolved in 53 ml. of methyl alcohol.

In Example 3, representing a 75 percent/25 percent solution of ODPA/6FDA, 37.5 mol percent ODPA and 12.5 mol percent 6FDA were dissolved in methanol and 50 mol percent of PPD dissolved in methanol was added thereto.

In Example 4, 60.86 grams of ODPA (25 mol percent) and 87.16 grams of 6FDA (25 mol percent) were dissolved in 249 ml. of methanol as shown in Example 1 above. To this solution, there was added 42.42 grams of PPD (50 mol percent) in 53 ml. of methanol.

In Examples 2-4, the resulting reaction mixtures were placed in a freezer after addition of the PPD solution in methanol to the mixed diester solution also in methanol. At a subsequent point in time after storage in the freezer, the samples were removed from the freezer, allowed to warm to room temperature and were thereafter stirred vigorously.

65.0 grams of the resin solution prepared in Example 3 were applied to a graphite fiber fabric measuring 14 inches by 14 inches. The resin solution was applied by squeegee to the fabric. The prepreg so formed was then dried in a vacuum oven at 37°-49° C., and nine pieces, each measuring 4 inches by 4 inches were cut from the sample. Eight of the 4 inch by 4 inch pieces of laminate were placed in a mold and cured at 400° C. for 2 hours.

A laminate was prepared from the frozen reaction solution of Example 4, after thawing, in the same manner described for the preparation of the laminate of Example 1.

In both cases, post curing of the sample was carried out by the application of heat in air at about 370° C. for about 10 hours followed by heat under nitrogen at about 400° C. for about 24 hours.

The glass transition temperature of the laminates prepared from Examples 3 and 4 is shown in TABLE 1 below along with the resin content of the samples shown in weight percent.

TABLE 1

Tg of Various ODPA/6FDA/PPD Polyimide Laminates

| EXAMPLE NO. | ODPA | 6FDA | PPD | Tg (°C.) (A) | (B) | RESIN CONTENT (Weight %) (A) | (B) |
|---|---|---|---|---|---|---|---|
| 2 | 45% | 5% | 50% | — | — | — | — |
| 3 | 37.5% | 12.5% | 50% | 421 | 429 | 43.04 | 30.42 |
| *4 | 25.0% | 25.0% | 50% | 384 | 379 | 33.72 | 28.53 |

*Loose fibers were observed after postcure.

The Tg of the laminate prepared in Example 3 was remarkably high.

EXAMPLE 5

A polyimide reaction mixture was prepared substantially as described in Example 1 above. 69.3 grams of diglyme and 58.5 grams of methanol were mixed, and ⅔ of the solvent mixture was poured into a resin kettle. 72.9 grams of ODPA and 34.8 grams of 6FDA were added to the solvent mixture in the resin kettle, and the mixture was heated under reflux until the dianhydrides dissolved in the solvent and reacted. The solution was cooled to room temperature, and 16.95 grams of paraphenylenediamine (PPD) and 16.95 grams of meta-phenylenediamine (MPD) were dissolved in the remaining ⅓ of the diglyme-methanol solvent mixture. The solution was stored in a freezer.

After storage, the reaction product was removed from the freezer, warmed to room temperature and stirred well. The reaction product contained 70% solids in diglyme after removal of the methanol. Woven graphite fabric was prepared by heating at 400° C. for one hour, cut into pieces of about 4 inches by 12 inches and weighed. An amount of the stirred resin solution removed from the freezer equal to 1.8 times the weight of the fabric was applied to the fabric with a squeegee to form a prepreg. The prepreg was dried in a circulating air oven for 15 minutes at 93° C. The prepreg was cut into 10 pieces, each having the dimension of 1 inch by 3 inches and laid up in a mold. The mold was closed and cured by heating at a temperature of 400° C. for 2 hours. During the cure cycle, the mold was open during heat-up to the initial temperature of 118° C. The samples were postcured by heating in air at 370° C. followed by heating at 400° C. under nitrogen for 24 hours.

Various other drying and cure cycles were performed using the resin prepared in Example 5 applied to the graphite fabric.

Another group of laminates was formed from the resin solution of Example 5 applied to a graphite fiber braid, the braid being cut and weighed to make an excess over 35 square inches of fabric. The resin solution of Example 5 was applied to the fabric by a squeegee in an amount such that the resin solution was 1.8 times the weight of the fabric. The laminate was dried in an oven for 20 minutes at 93° C. or until nearly dry, but tacky, and cut into 10 pieces which were laid-up in a mold. The mold was closed and the composite (laminate) cured at 400° C. for two hours. The composite was removed from the mold and was postcured in air at a temperature of 370° C. for 24 hours.

Various modifications of the program for the preparation of the foregoing laminates were carried out to determine the effect of the cure and postcure on the various samples.

The glass transition temperature of several of the laminates prepared above after nitrogen postcure was high. The glass transition temperature of samples of the laminates prepared above cut into ½ inch by 2 inch pieces and postcured in nitrogen at 400° C. for 24 hours had a glass transition temperature ranging from about 422° C. to about 434° C.

EXAMPLES 6-7

In Example 6, about 75 grams of BPDA was placed in one clean, dry 150 ml. beaker and about 38 grams of 6FDA was placed in a second clean, dry 150 ml. beaker, and the beakers were placed in a vacuum oven at about 150° C. and full vacuum overnight (about 16 hours). Heat was then discontinued while maintaining vacuum until the oven cooled to about 50° C. 67.6 grams of diglyme and 57.6 grams of methanol were mixed in a clean, dry bottle. The beakers in the vacuum oven were sealed (covered) with plastic film and removed from the vacuum oven. Sufficient BPDA was removed from the beaker containing same until 69.14 grams remained, and the 69.14 grams of BPDA was transferred to a resin kettle. This was repeated with the 6FDA beaker until 34.8 grams of 6FDA remained in the beaker. The 34.8 grams of 6FDA were transferred to the resin kettle. Each beaker was rinsed with a small amount of the solvent mixture, and the rinse mixture was transferred to the resin kettle to ensure complete dianhydride transfer. At least ¾ of the above solvent mixture was transferred to the resin kettle. This mixture was refluxed in the resin kettle until the solids were dissolved and reacted. After dissolution was complete, the mixture was cooled to near room temperature. The mixture was stirred until all solids were dissolved in the solvent, and the reaction mixture was then stored in a freezer.

In Example 7, all conditions and amounts were identical to those of Example 6 except the solvent mixture contained 67.6 grams of N-methyl-2-pyrrolidone (NMP) and 57.6 grams of methanol.

The reaction mixture of Example 7 was removed from the freezer, warmed to room temperature and stirred well. The reaction mixture was then applied to a 10 inch×3 inch piece of woven graphite fiber fabric in an amount equal to twice the weight of the fabric to form a prepreg. The prepreg was placed in an oven preheated at 93° C. for 20 minutes. The prepreg was then removed from the oven and cut into 10 pieces, each piece measuring 1 inch×3 inches. The 10 pieces were laid up in a mold; the mold was closed and the laminate thereafter cured at 400° C. for 2 hours. This was followed by a post cure at 400° C. for 24 hours under nitrogen. The Tg of two samples of this laminate were measured at 408° C. and 405° C.

EXAMPLES 8-10

In Examples 8-10, ODPA:6FDA was mixed at a molar ratio of 3:1 in methanol.

In Example 8, the aromatic diamine was PPD, and aminophthalonitrile was added to the reaction mixture as a reactive end-capping agent to control molecular weight.

In Example 9, the aromatic diamine was PPD, and aminodiphenyl acetylene was added to the reaction mixture as a reactive end-capping agent to control molecular weight.

In Example 10, the aromatic diamine was a 50/50 mixture of PPD and MPD, and aminodiphenyl acetylene was added to the reaction mixture as a reactive end-capping agent to control molecular weight.

Suitable laminates can be prepared from the respective polyimides of Examples 8-10.

EXAMPLES 11-12

Examples 11 and 12 are provided for comparative purposes.

Example 11 is a polyimide derived from 6FDA and p-phenylenediamine (PPD). Example 12 is a polyimide derived from ODPA and p-phenylenediamine (PPD).

The Tg of polyimides derived from Example 11 is from about 350° C. to 370° C. The Tg of the polyimide derived from Example 12 is about 300° C.

The above data and tests show that improved Tg is achieved in laminates prepared from the polyimides of the present invention.

Although the above examples are directed to only a few of the very many variables which can be used in the practice of the present invention and to the resulting polyimides and laminates (composites) made therefrom, it should be understood that the present invention is directed to a much broader variety of polyimides and laminates (composites) and method for making as shown in the description preceeding these examples.

What is claimed is:

1. A polyimide having improved glass transition temperature consisting essentially of the product of reaction of:
    (a) mixed dianhydrides wherein one of the mixed dianhydrides is a biphenyl dianhydride or derivatives thereof, or an oxydiphthalic anhydride or derivatives thereof, or a mixture thereof and the other dianhydride is 2,2-bis(3,4-dicarboxyphenyl)-hexafluoropropane dianhydride or derivatives thereof, and
    (b) aromatic diamines 2. The polyimide of claim 1 wherein the molar ratio of aromatic diamines to mixed dianhydrides is about 1.1:1 to about 0.9:1.

3. The polyimide of claim 1 wherein the molar ratio of biphenyl dianhydride or derivatives thereof, or oxydiphthalic anhydride or derivatives thereof, or a mixture thereof to 2,2-bis(3,4-dicarboxyphenyl)hexafluoropropane dianhydride or derivatives thereof is about 1:9 to about 9:1.

4. The polyimide of claim 1 wherein the molar ratio of biphenyl dianhydride or derivatives thereof, or oxydiphthalic anhydride or derivatives thereof, or a mixture thereof to 2,2-bis(3,4-dicarboxyphenyl)hexafluoropropane dianhydride or derivatives thereof is about 3:1.

5. The polyimide of claim 1 wherein the oxydiphthalic anhydride is selected from the group consisting of 4,4'-oxydiphthalic anhydride, 3,4'-oxydiphthalic anhydride, 3,3'-oxydiphthalic anhydride and mixtures thereof.

6. The polyimide of claim 1 wherein the oxydiphthalic anhydride is 4,4'-oxydiphthalic anhydride.

7. The polyimide of claim 1 wherein the aromatic diamine has the formula, $$H_2N-R-NH_2$$

wherein R is a divalent aromatic hydrocarbon radical having from 6 to about 20 carbon atoms and halogenated derivatives thereof.

8. The polyimide of claim 7 wherein the aromatic diamine is meta-phenylenediamine.

9. The polyimide of claim 7 wherein the aromatic diamine is para-phenylenediamine.

10. The polyimide of claim 7 wherein the aromatic diamine is a mixture of para-phenylenediamine and meta-phenylenediamine.

11. Composites of the polyimides of claim 1.

12. Composites of the polyimides of claim 1 further comprising reinforcing fillers selected from the group consisting of glass fibers, graphite fibers, silicon carbide fibers, carbon fibers and mixtures thereof.

13. Composites of the polyimides of claim 12 wherein the molar ratio of aromatic diamine to mixed dianhydride is about 1.1:1 to about 0.9:1.

14. Composites of the polyimides of claim 12 wherein the molar ratio of biphenyl dianhydride or derivatives thereof, or oxydiphthalic anhydride or derivatives thereof, or a mixture thereof to 2,2-bis(3,4-dicarboxyphenyl)-hexafluoropropane dianhydride or derivatives thereof is about 3:1.

15. Composites of the polyimides of claim 12 wherein the molar ratio of biphenyl dianhydride or derivatives thereof or oxydiphthalic anhydride or derivatives thereof or a mixture thereof to 2,2-bis(3,4-dicarboxyphenyl)-hexafluoropropane dianhydride or derivatives thereof is about 1:9 to about 9:1.

16. Composites of the polyimides of claim 12 wherein the aromatic diamine has the formula,

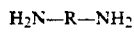

wherein R is a divalent aromatic hydrocarbon radical having from 6 to about 20 carbon atoms and halogenated derivatives thereof.

17. Composites of the polyimide of claim 16 wherein the aromatic diamine is para-phenylenediamine.

18. Composites of the polyimides of claim 16 wherein the aromatic diamine is meta-phenylenediamine.

19. Composites of the polyimides of claim 12 wherein the aromatic diamine is a mixture of para-phenylenediamine and meta-phenylenediamine.

20. Composites of the polyimides of claim 12 wherein the oxydiphthalic anhydride is selected from the group consisting of 4,4'-oxydiphthalic anhydride, 3,4'-oxydiphthalic anhydride, 3,3'-oxydiphthalic anhydride and mixtures thereof.

21. A method of increasing the glass transition temperature of polyimide resins derived from a reaction mixture of aromatic diamines and mixed dianhydrides wherein one of the mixed dianhydrides is a biphenyl dianhydride or derivatives thereof, or an oxydiphthalic anhydride or derivatives thereof, or a mixture thereof, consisting essentially of adding 2,2-bis(3,4- dicarboxyphenyl)hexafluoropropane dianhydride or derivatives thereof as the other mixed dianhydride to the reaction mixture whereby a polyimide is formed by the intercondensation of aromatic diamines and the mixed dianhydrides.

22. The method of claim 21 wherein the molar ratio of aromatic diamine to mixed dianhydride is about 1.1:1 to about 0.9:1.

23. The method of claim 21 wherein the molar ratio of biphenyl dianhydride or derivatives thereof or oxydiphthalic anhydride or derivatives thereof or a mixture thereof to 2,2-bis(3,4-dicarboxyphenyl)hexafluoropropane dianhydride or derivatives thereof is about 3:1.

24. The method of claim 21 wherein the molar ratio of biphenyl dianhydride or derivatives thereof, or oxydiphthalic anhydride or derivatives thereof, or a mixture thereof to 2,2-bis(3,4-dicarboxyphenyl)hexafluoropropane dianhydride or derivatives thereof is about 1:9 to about 9:1.

25. The method of claim 21 wherein the oxydiphthalic anhydride is selected from the group consisting of 4,4'-oxydi-phthalic anhydride, 3,4'-oxydiphthalic anhydride, 3,3'-oxydiphthalic anhydride and mixtures thereof.

26. The method of claim 21 wherein the oxydiphthalic anhydride is 4,4'-oxydiphthalic anhydride.

27. The method of claim 21 wherein the aromatic diamine is p-phenylenediamine, m-phenylenediamine or mixtures thereof.

28. A polyimide, having improved glass transition temperature consisting essentially of structural units of the formula (I):

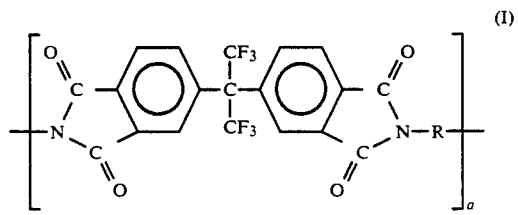

and structural units of the formula:

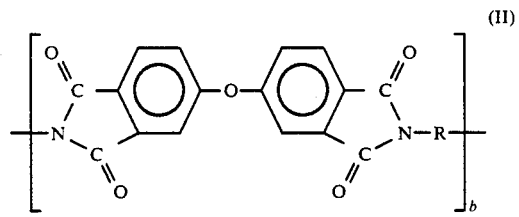

or

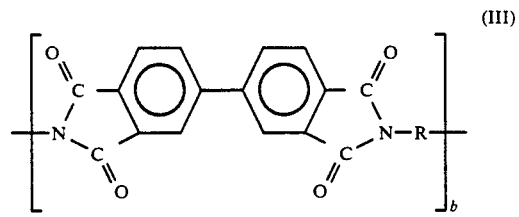

or mixtures of formulas (II) and (III), where a and b represent any ratio from about 1:9 to about 9:1, and R is a divalent aromatic hydrocarbon radical having from 6 to about 20 carbon atoms and halogenated derivatives thereof.

29. The polyimide of claim 28 comprising about equimolar amounts of Formula (I) and Formula (II).

30. The polyimide of claim 28 comprising about equimolar amounts of Formula I and Formula (III).

31. The polyimide of claim 28 comprising about equimolar amounts of Formula (I) and Formulas (II) and (III) combined.

32. Adhesives of the polyimide of claim 31.

33. The polyimide of claim 28 comprising about equimolar amounts of Formula (I), Formula (II) and Formula (III).

34. Adhesives of the polyimide of claim 33.

35. The polyimide of claim 28 wherein R is a paraphenylene radical derived from p-phenylenediamine.

36. The polyimide of claim 28 wherein R is a meta-phenylene radical derived from m-phenylenediamine.

37. The polyimide of claim 28 wherein the mole fraction of Formula (I) is a number greater than 0 and smaller than 1 and the mole fraction of Formula (II) or Formula (III) or mixtures thereof is 1 minus the mole fraction of Formula (I).

38. The polyimide of claim 28 wherein the mole fraction of Formula (I) is 0.25 and the mole fraction of Formula (II) or Formula (III) is 0.75.

39. The polyimide of claim 28 wherein R is a mixture of meta-phenylene radical derived from meta-phenylenediamine and para-phenylene radical derived from para-phenylenediamine.

* * * * *